No. 849,494. PATENTED APR. 9, 1907.
C. OWENS.
SOAP HOLDER.
APPLICATION FILED MAY 9, 1906.

Witnesses:
Norris G. Stensland
D. F. Haynes

Charles Owens,
Inventor:
by Cyrus W. Rice
Attorney

UNITED STATES PATENT OFFICE.

CHARLES OWENS, OF CHATTANOOGA, TENNESSEE.

SOAP-HOLDER.

No. 849,494.            Specification of Letters Patent.            Patented April 9, 1907.

Application filed May 9, 1906. Serial No. 315,884.

*To all whom it may concern:*

Be it known that I, CHARLES OWENS, a citizen of the United States, residing at the city of Chattanooga, in the county of Hamilton and State of Tennessee, have invented a new and useful Soap-Holder, of which the following is a specification.

My invention relates to soap-holders; and its object is to provide a soap-holder to contain a cake of soap for use in shaving, &c., which will protect the soap, keep the same clean, prevent the hands of the user from being soiled while using the soap, &c.

My invention is embodied in the following-described mechanism and more particularly pointed out in the claims.

Figure 1:
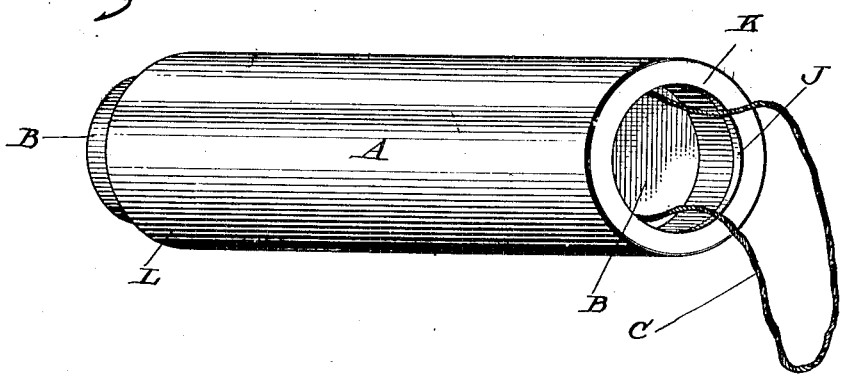
Figure 2:
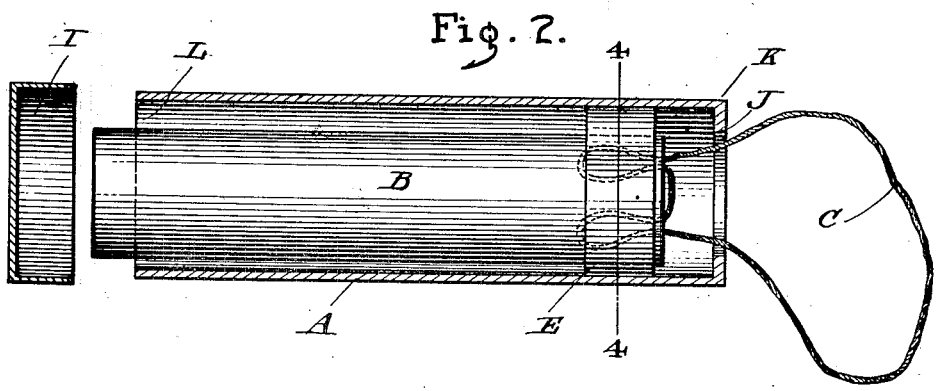
Figure 3:
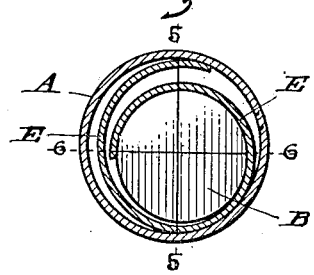

In the accompanying drawings, Figure 1 is a perspective view of my soap-holder. Fig. 2 is a longitudinal sectional view thereof, and Fig. 3 is a cross-section on line 4 4 of Fig. 2.

A container A, preferably cylindrical in form, has a suitable spring, (one form of which is shown as E, being spirally formed,) which spring is adapted to clasp and hold the soap cake B in a desired position, but so that the cake may be easily moved longitudinally by hand, the spring E being also adapted to press outwardly against the walls of the container, it moving with the cake. This spring E forms a carrier for the soap cake, moving therewith and securely holding the same. One end K of the container has preferably a shoulder J or other suitable projection sufficient to prevent the cake from passing through that end of the container. The cake may, however, pass out of the other end L of the container when in use, and said container may be closed by the cap I when the soap is not in use. A cord C is attached in any suitable way to the cake or the spring E and extends through the end K of the container, by means of which the cake may be drawn into the container. The inward pressure of the spring E on line 6 6 to clasp the cake and its outward pressure on line 5 5 to retain the cake and spring in a desired position are illustrated in Fig. 4.

When it is desired to use the soap, the end of the cake is pushed out of the end L of the container by the finger being inserted into the end K. The cake is held in the desired position by the spring When the use is ended, the cake is drawn into the container by the cord C and the cap I replaced.

Not confining myself to construction shown further than set forth in the claims, I claim—

1. In a soap-holder, a container having an orifice through which the soap cake may project, and another orifice through which means may be applied to push said cake into a desired position, said last orifice being provided with a projection to prevent the passage of said cake therethrough, a soap-carrier adapted to securely retain said cake, and a spring intermediate the container and the carrier for holding in a desired position the carrier slidably in either direction.

2. In a soap-holder, a container and a spirally-formed soap-cake carrier having an inward spring-pressure on said cake for tightly clasping the same and an outward spring-pressure on the container for holding in a desired position the carrier and said cake slidably along the container in either direction.

3. In a soap-holder, a container having an orifice through which the soap cake may project, a soap-carrier adapted to securely retain the soap cake free from the walls of the container, so that an air-passage is maintained between the soap and the container-walls, and a spring intermediate the container and the carrier for holding in a desired position the carrier slidably in either direction.

4. In a soap-holder, a container having an orifice through which the soap cake may project, a soap-carrier adapted to securely retain the soap cake free from the walls of the container, so that an air-passage is maintained between the soap and the container-walls, a spring intermediate the container and the carrier for holding in a desired position the carrier slidably in either direction, and a cord connected with the soap cake for drawing the same into the container.

In testimony whereof I have signed my name to this specification in the presence of two subscribing witnesses.

CHARLES OWENS.

Witnesses:
     JOHN H. CANTRELL,
     W. B. GARVIN.